INVENTOR.
Theodore G. Hines

INVENTOR.
Theodore G. Hines

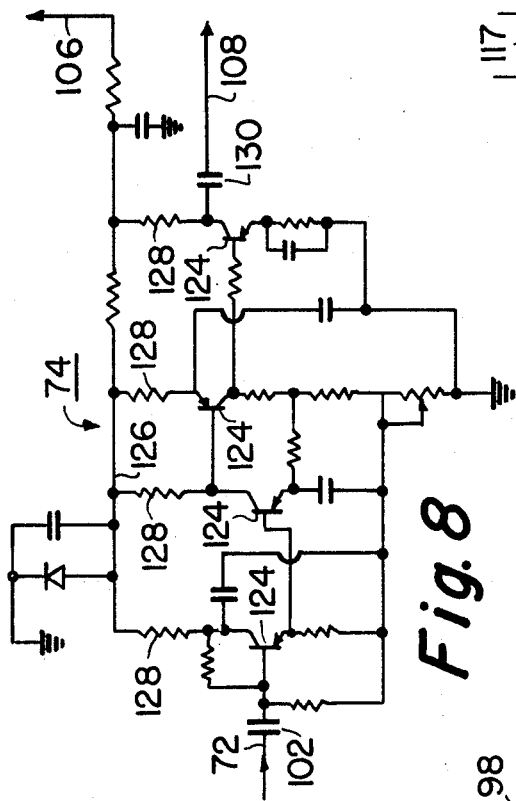
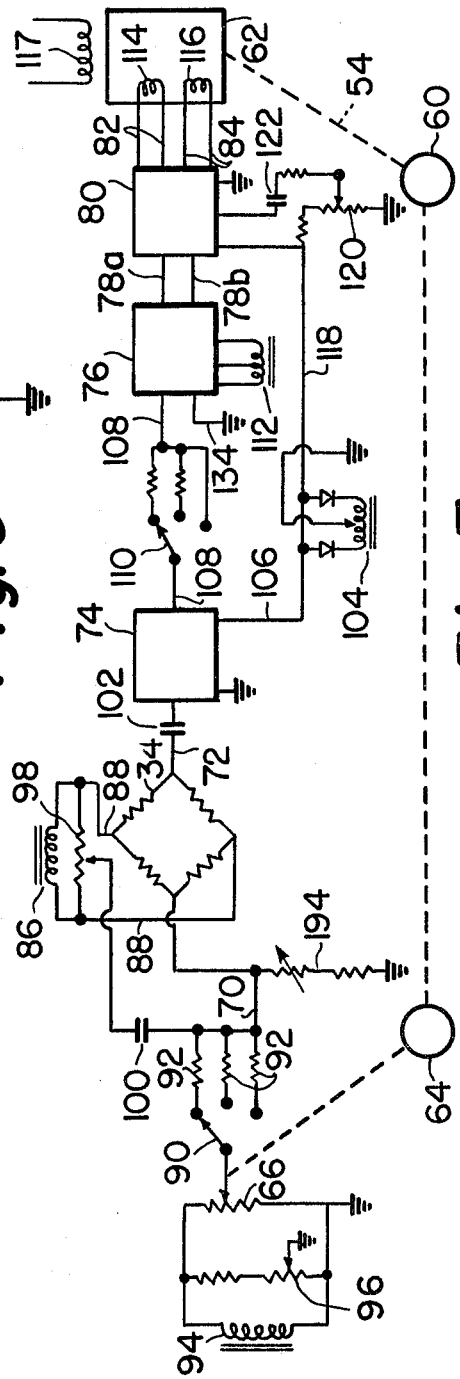
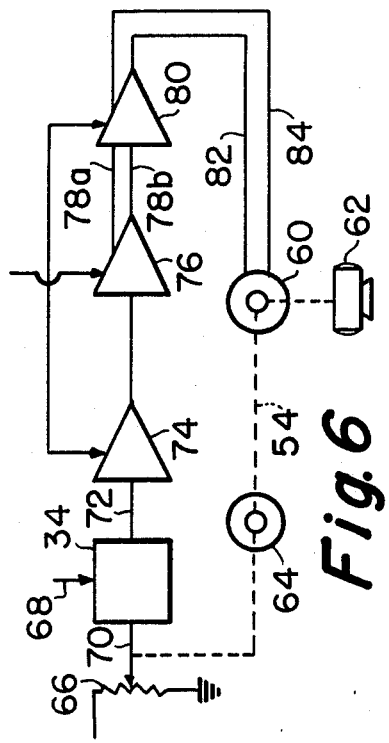
Fig. 8
Fig. 7
Fig. 6
INVENTOR.
Theodore G. Hines

July 23, 1968

T. G. HINES 3,394,384

RECORDING TEST EQUIPMENT AND CIRCUIT

Filed Nov. 15, 1966

INVENTOR.
Theodore G. Hines
BY
his attorneys

United States Patent Office 3,394,384
Patented July 23, 1968

3,394,384
RECORDING TEST EQUIPMENT
AND CIRCUIT
Theodore G. Hines, % Pine Instrument Co., South Center
St., P.O. Box 429, Grove City, Pa. 16127
Filed Nov. 15, 1966, Ser. No. 594,518
17 Claims. (Cl. 346—32)

ABSTRACT OF THE DISCLOSURE

The invention comprises an indicating or recording circuit having a normally balanced transducer, a source of variable balancing potential coupled to said transducer, with the transducer being capable of yielding an output when subjected to a stressing force, an indicating or recording mechanism, driving means for the mechanism, circuit means coupled to the transducer output for energizing said driving means, and balancing potential varying means coupled to the mechanism, driving means for terminating the transducer output signal and for de-energizing said driving means when the indicating or recording mechanism has indicated the amount of the stressing force.

---

The present invention relates to a recording test equipment and more particularly to testing equipment of the character described arranged for automatically recording a varying load applied to a specimen and the resultant "flow" or deformation thereof.

In a machine of the character described to which the invention relates the specimen or material to be tested is supported upon a movable stand for pressure contact with a load cell or other transducer with the output of the transducer and the rate of movement of the stand being related to a recording stylus for automatic recording purposes on a suitable chart. Although the invention is illustrated in connection with compression testing equipment, it will be understood that the recording features thereof can be readily adapted to other types of testing equipment as where a specimen is secured between fixed and movable crossheads and one of the crossheads is moved toward and away from the other or angularly displaced relative to the axis of the other to test the specimen in compression, tension or flexure.

Previous automatic recording circuits for use with such equipment frequently utilized null-type circuit involving a complicated arrangement of differential transformers, the secondary windings of which are arranged in series opposition. The resulting voltages from the windings are amplified and utilized to energize a controlling phase of a two-phase motor, the other phase of which is energized from a 60 cycle source. The type of motor employed is not only expensive in first cost, but requires an amplifier involving no little expense owing to the amount of power which must be handled by the arrangement. Moreover, the movements of the specimen or crosshead associated therewith had to be followed by means of an extensiometer or the like which further increased the expense of the system.

The recording test equipment and circuit of the present invention overcomes these economic difficulties by controlling the recording mechanism with a transducer-generated electric signal which is produced proportionally to the stress developed in the specimen. On the other hand, the resulting deformation of the specimen is related to the recording apparatus directly through the driving means utilized to actuate the specimen crosshead or holder.

Briefly, the recording test press as disclosed herein comprises a movable specimen holder or stand with which the specimen is urged against a signal generating transducer such as a strain gage type load cell. The driving means for the specimen holder is also employed, directly through a unique cable arrangement for displacing a recording stylus, for example in the abscissa direction on a recording chart. In one arrangement of the invention, the specimen holder and, therefore, the abscissa stylus displacement are controlled so as to assume a constant rate of movement in the abscissa direction of the chart.

On the other hand, ordinate movement of the stylus is controlled by the load cell output which is amplified in a preamplifier and then fed to a phase detecting network. The output of the phase detector provides a pair of signal paths, with the signal being switched to one path by the phase detector when the load being applied to the specimen is increasing and to the other path under conditions of decreasing load. The phase detected signals are then conducted through a second amplifier to a relatively inexpensive shaded pole motor. The motor is provided with clockwise and counterclockwise shading windings, which are effective to reverse the motor at relatively low impressed voltages. In one arrangement of the apparatus, the windings are coupled through static switching means to a source of biasing potential, and the static switching means are actuatable by an amplified signal of relatively low amplitude. Thus, switching of line voltages or other relatively large voltages is avoided. The aforementioned output signals are thus arranged for energizing one or the other of the aforementioned shading windings depending upon the rotational direction of the motor which is required for the indication of either increasing or decreasing loads by the stylus.

These and other objects, features and advantages of the invention will be elaborated upon during the forth-coming description of certain presently preferred embodiments of the invention, together with preferred methods of practicing the same.

In the accompanying drawings there have been shown certain presently preferred embodiments of the testing apparatus and circuit, together with certain preferred methods of practicing the same:

FIGURE 6 is a schematic circuit diagram of one form of recording circuit and mechanism arranged in accordance with the invention;

FIGURE 7 is a schematic circuit diagram of a modified form of the apparatus shown in FIGURE 6, wherein the supply circuits and the interconnections between the remaining components of FIGURE 6 are illustrated in greater detail;

FIGURE 8 is a detailed schematic circuit diagram of the preamplifier shown generally in FIGURES 6 and 7.

Figure 1:
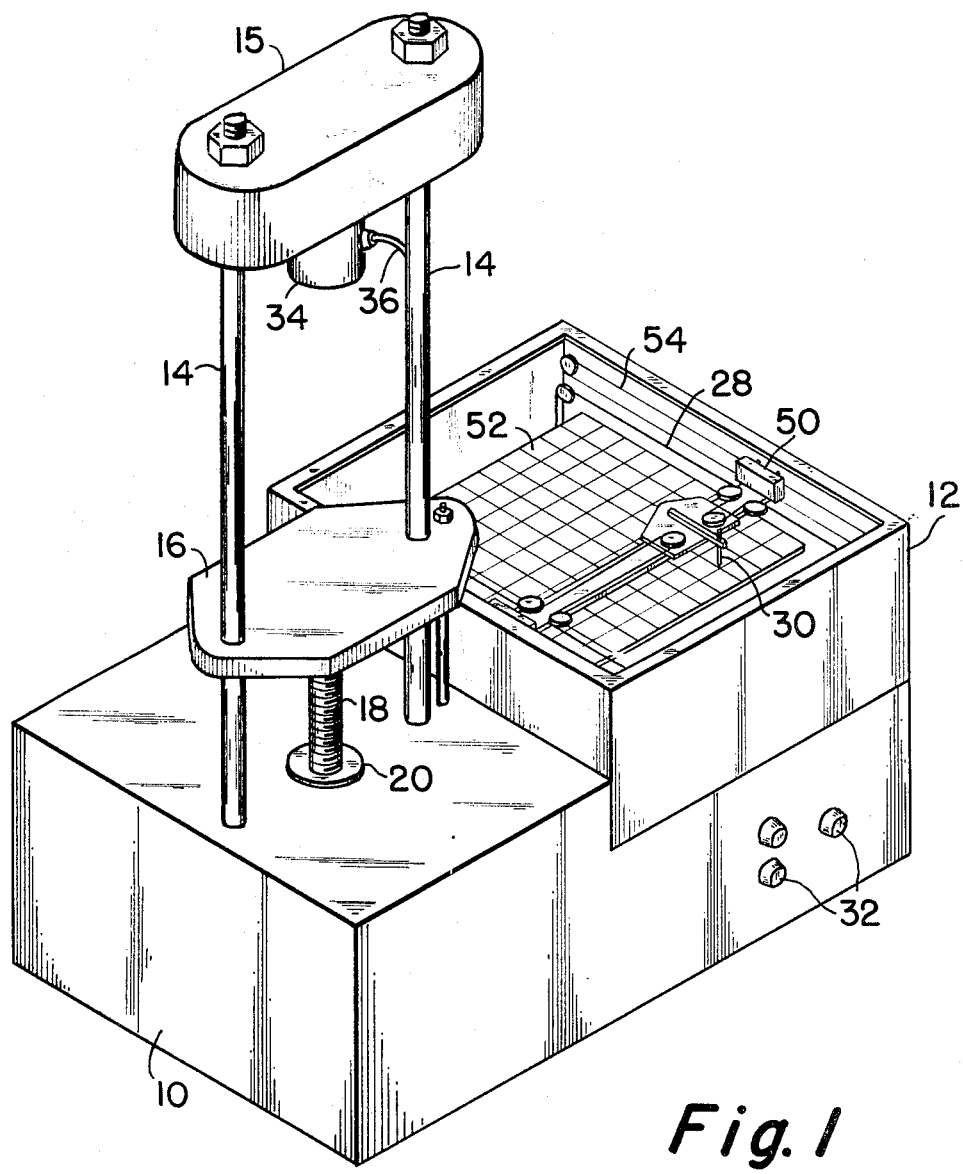
FIGURE 1 is a isometric view of one form of recording test press arranged in accordance with the invention.

Referring now more particularly to FIGURES 1–5 of the drawings, the exemplary form of the recording test press shown therein comprises a lower casing or stand 10 and a recorder housing 12 mounted thereon. Adjacent the recorder housing 12 are mounted a pair of uprights or standards 14, near the upper ends of which is supported stationary crosshead 15. A movable specimen stand or holder 16 slidably engages the standards 14 and is rotatably secured to the upper end of drive screw 18. As better shown in FIGURE 2, the screw 18 forms the mechanical output of a conventional screwjack unit 20 driven by drive motor 22 through chain 24. In certain applications a Duff-Norton Worm Gear Jack No. 1805 has been employed as the unit 20. The drive motor 22 also is employed to rotate cable pulley 26 through secondary jack output 21 and magnetic clutch 23 by means of connecting shaft 25 and gears 27, and thereby to reciprocate cable 28 for the purpose described more fully hereinafter. The up and down movements of the specimen stand 16 and the corresponding right and left abscissa movements (as viewed in FIGURES 2 and 3) of recording stylus 30 are controlled by suitable up, down and stop switches mounted at the front of the press, the push-button actuation of which are denoted generally by reference character 32.

Mounted on the undersurface of the crosshead 15 is a conventional load cell 34 which is coupled to supply and output circuits presently to be described through cable 36. In this example the load cell 34 generally is aligned with the central axis of the movable specimen stand 16.

Figure 4:
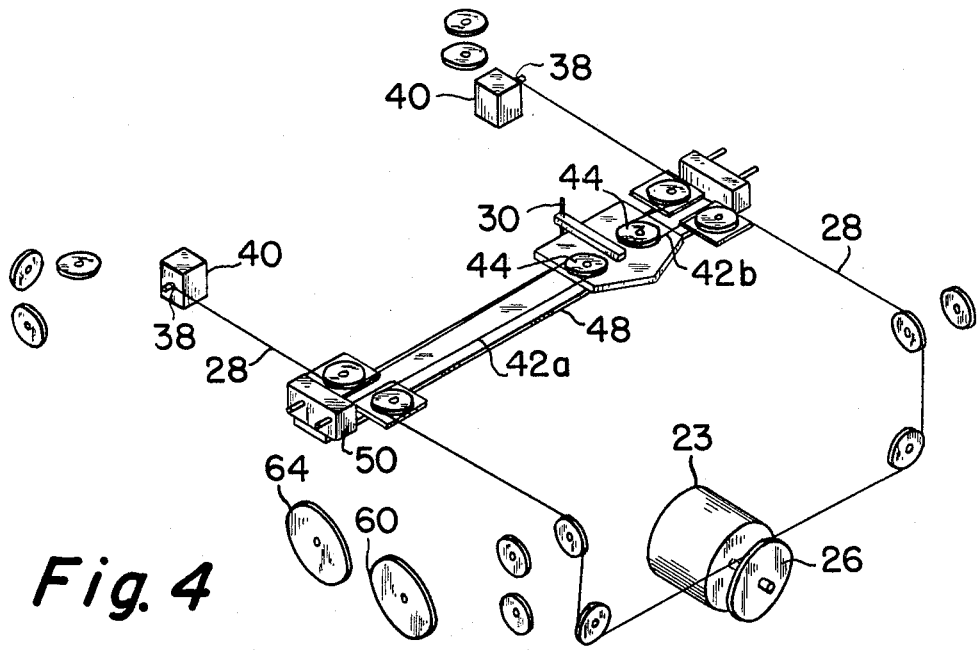
FIGURE 4 is a cable and drive means arrangement for the stylus shown in the preceeding figures and showing one form of mechanical coupling between the stylus and the specimen holder and the drive therefor.

Referring now more particularly to FIGURE 4 of the drawings, a unique cable drive arrangement, including the the aforementioned drive pulley 26 and cable 28 are illustrated. In this arrangement the ends 38 of the cable 28 are pinned or staked respectively to a pair of stationary supports 40. A length of the cable is wound upon the drive pulley 26 a sufficient number of times to prevent slippage of the cable.

Figure 2:
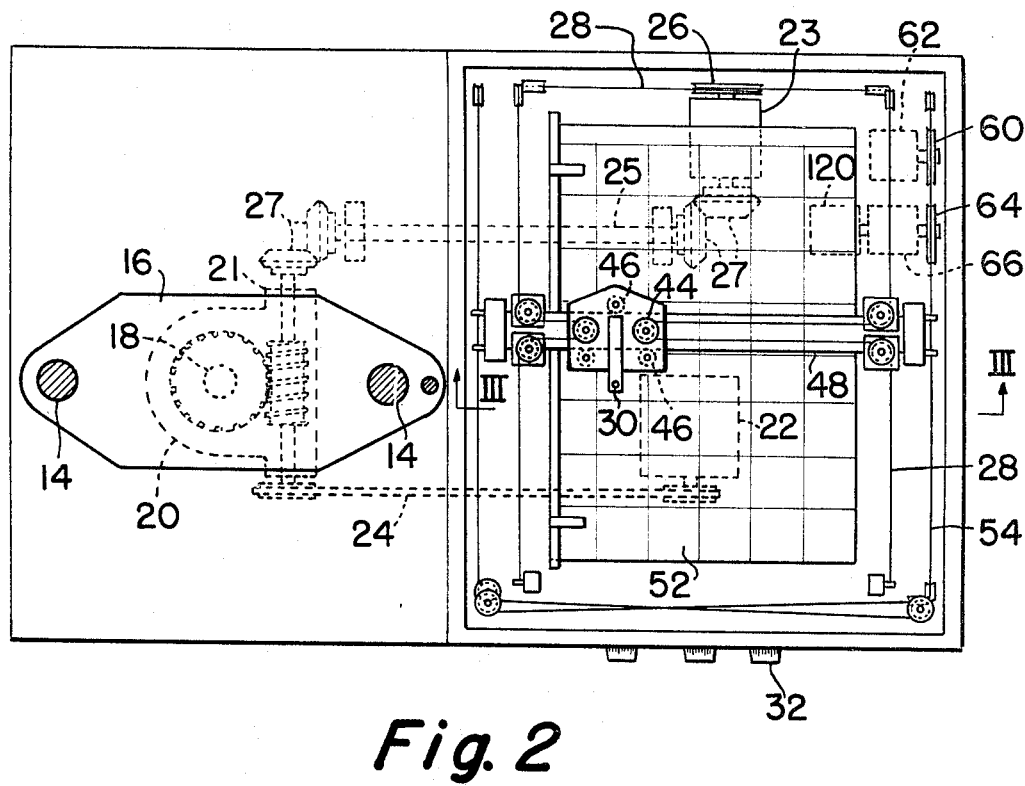
FIGURE 2 is an enlarged, top plan view of the recording and drive mechanisms as shown in FIGURE 1, with parts being removed and other parts broken away to show the invention more clearly.

A pair of loops 42a and 42b are formed at the sides respectively of the cable layout with their bight portions engaging respectively stylus pulleys 44. The stylus assembly 30, as better shown in FIGURE 2, is mounted upon pulleys 46 rotatably secured to the underside thereof in engagement with bar 48 of the stylus carriage 50.

With this arrangement, rotation of the flow drive pulley 26 in the clockwise direction shortens the loop 42a and lengthens the loop 42b to move the stylus assembly 30 to the left as viewed in FIGURE 4. Rotation of the drive pulley 26 in the opposite or counterclockwise direction similarly shortens the loop 42b to move the stylus assembly to the right.

The specimen stand drive motor 22 is suitably geared to the stand through gear unit 20 and to the flow drive pulley 26 such that the stylus assembly 30 is moved a given number of suitable deformation units across the chart 52 corresponding to similar movement of the specimen stand 16 against a specimen (not shown) clamped between the stand 16 and the crosshead 15.

Figure 3:
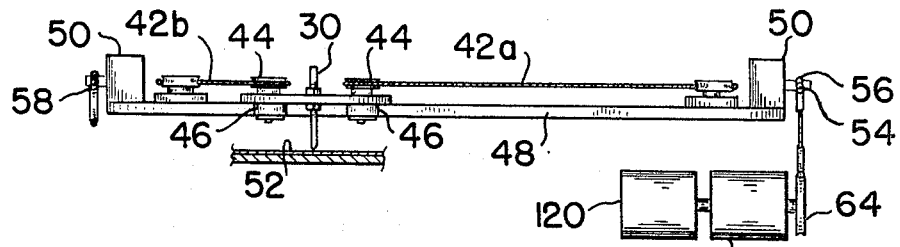
FIGURE 3 is a partial cross-sectional view of the apparatus as shown in FIGURE 2 and taken along reference line III—III thereof.
Figure 5:
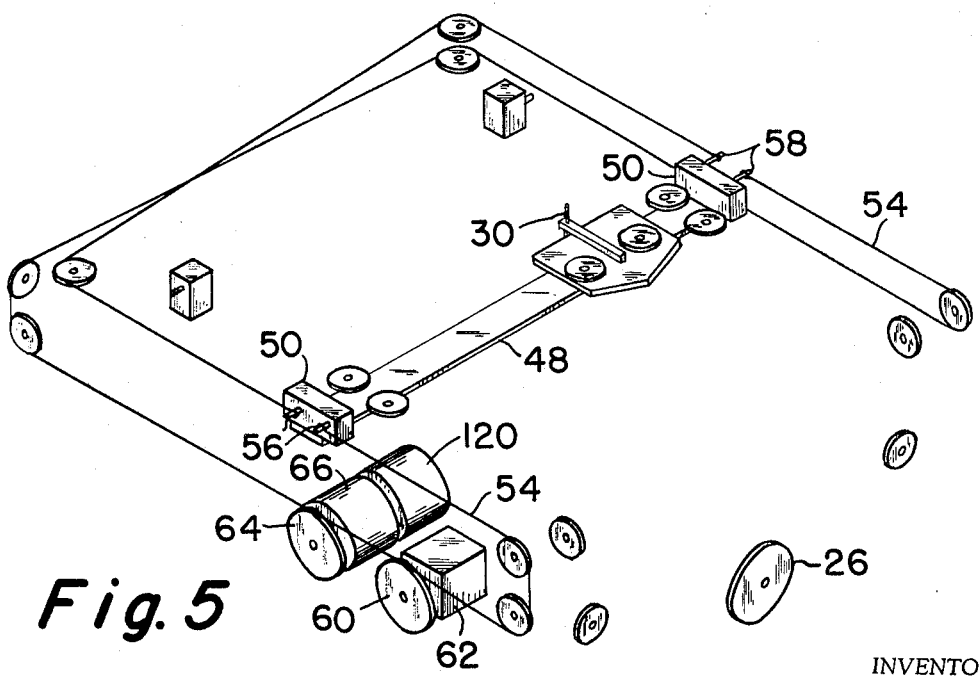
FIGURE 5 is another cable and drive means arrangement for moving the stylus in accordance with the outputs of the aforementioned transducer and phase detector associated therewith.

Referring now to FIGURES 3 and 5 of the drawings, a unique cable drive arrangement for driving the stylus carriage 50 in the ordinate direction of the chart 52 is illustrated. In this arrangement an essentially continuous cable 54 is used, the adjacent ends of which are staked to one end of the stylus carriage 50 as denoted by reference character 56. At the other end of the stylus carriage, an adjacent run of the cable 54 is similarly secured as denoted by reference character 58. The cable 54 is moved in either direction throughout its path by drive pulley 60 and shaded pole motor 62, which drive the stylus assembly 30 in its ordinate direction relative to chart 52. As better shown in FIGURES 2, 3 and 5 of the drawings, the cable 54 is attached to its drive pulley 60, as set forth above in connection with cable 28 (FIGURE 4), and similarly to an operating pulley 64 coupled to a balancing potentiometer arrangement 66 the purpose of which, as described in detail below, is to balance the tendency of the stylus carriage motor 62 to lag load changes. The reversible, shaded pole motor 62 is controlled by the transducer signal circuit described in various forms hereinafter with reference to FIGURES 6–9 of the drawings.

When the shaded pole motor 62 is energized in the counterclockwise direction of drive pulley rotation (as viewed in FIGURE 5), the stylus carriage 50 is moved generally to the right in FIGURE 5 or in the ordinate chart direction of increasing load. Rotation of the load drive pulley 60 in the opposite direction moves the stylus carriage 50 in the ordinate direction of decreasing load.

Referring now to FIGURE 6 of the drawings, there is illustrated therein a simplified form of the recording apparatus and circuit. In this arrangement a 60-cycle excitation or supply voltage is applied to the load cell 34 through conductor 68 while an adjustable balancing voltage is applied through conductor 70 from a servo-balance potentiometer 66 coupled to a suitable source of supply potential (not shown). The load cell output is added to the voltage from potentiometer 66 and is supplied through conductor 72 to preamplifier 74 and thence to phase detector 76 and through output conductors 78a and 78b to driver amplifier 80.

The character of the phase-detected output signal appearing on output conductors 78a and 78b is such that the voltage on a given one of the conductors is made variably more positive with respect to the voltage on the other of the conductors 78a and 78b when the load applied to the specimen is increasing, and variably more negative, when the load is decreasing. The amount of the voltage differential in either direction between the conductors 78a and 78b, moreover, is determined by the rate of load change on the specimen and consequently is used, as explained below, to control the recording speed of the carriage drive 62.

In the driver-amplifier 80 the signal entering on conductors 78a and 78b is employed to actuate throttling means coupled respectively to shade winding conductors 82 and 84 to permit a variable amount of current to flow through the shading windings of the stylus carriage motor 62 under impetus of locally generated potentials. The drive motor 62 is driven clockwise or counterclockwise depending upon whether the throttling means coupled to conductor 82 or 84 is more strongly actuated by the driver amplifier 80. At the same time the servo-balance potentiometer 66 is adjusted by rotation of its actuating pulley 64 driven by cable 54, to restore balance to the load-cell portion of the circuit and to terminate the signal on conductor 72 after the stylus drive motor has caused the load change to be recorded.

When the cable pulley 60 is rotated in the counterclockwise or increased load direction by the drive motor 62, the potentiometer pulley 64 is so coupled to the potentiometer 66 that the output thereof to the load cell 34 is increased until the load cell 34 becomes balanced at the increased load thereon at which time energization of the motor 62 is terminated. On the other hand, during intervals of decreasing load the pen drive motor 62 is rotated in the opposite direction by the driver-amplifier circuit 80 until the balancing potentiometer 66 is adjusted in the opposite direction to balance again the load cell 34. The load cell 34 potential is normally balanced by a balancing A.C. potential on conductor 70 which is equal to but approximately 180° out of phase with the A.C. voltage produced in the load cell. Thus an increasing load on the load cell 34 produces a signal on conductor 72 represented by a voltage differential in phase with the balancing potentiometer voltage, while a decreasing load produces a signal approximately 180° out of phase with the balancing potentiometer voltage.

Referring now to FIGURE 7 of the drawings, various interconnections between certain major circuit components, such as the load cell 34, preamplifier 74, phase detector 76, driver amplifier 80 and stylus carriage motor 62, are set forth in greater detail in accordance with another arrangement of the invention.

In the circuit of FIGURE 7 the load cell 34 is illustrated as a conventional 4-element strain gage bridge arrangement, the excitation voltage to which is supplied by secondary transformer winding 86 through conductors 88. The secondary winding 86 together with other secondary windings mentioned below (with the exception of signal transformer 132 in this example) are wound upon a common core to which is applied also a suitable primary winding (not shown).

The balancing voltage output of the servo-balance potentiometer 66 is conducted through range selector switch 90 and conductor 70 to the load cell 34. The range selector 90 includes a number of resistances 92 of differing values in order to adjust the balancing voltage either for the use of differing load cells or the same load cell 34 over differing load ranges. The balance potentiometer 66 is supplied by secondary transformer winding 94 across which is connected a variable resistance zero adjustment denoted generally by reference character 96. A phase adjustment, including variable resistance 98 and capacitance 100 are connected across the excitation secondary winding 86 in order to counter-balance the various reactive voltages picked up around the circuit.

The output of the load cell 34 is fed through conductor 72 and coupling capacitance 102 to the input of the preamplifier 74 to which a full-wave rectified, negative voltage is supplied through conductor 106 from transformer secondary winding 104 and associated rectifying circuit. The preamplifier output on conductor 108 is conducted through range selector switch 110 to the input of the phase detector 76. As described more fully hereinafter, in the phase detector circuit 76 the signal supply thereto through conductor 108 is compared to a reference voltage supplied to the phase detector from a center-tapped transformer winding 112. The purpose of the selector switch 110 is to decrease the amplitude of the preamplifier output when the load ranges are changed by selector switch 90. In furtherance of this purpose the selector switches 90 and 110 can be ganged (not shown) for simultaneous operation, if desired.

In the driver-amplifier 80, a load signal supplied thereto through conductors 78a and 78b is further amplified, after which it is utilized to throttle the shade winding circuits respectively for the counterclockwise and clockwise motor windings 114 and 116. Locally generated A.C. potentials exist in windings 114 and 116 as a result of the transformer effect with motor field winding 117. The aforementioned circuits are variously throttled so that the resultant current flow in a given winding exceeds that of the other winding depending upon whether load is increasing or decreasing. Thus the motor 62 drives the cable 54 and stylus carriage 50 in the ordinate recording direction of increasing load, when, in this example, the current flow in counterclockwise winding 114 predominates, and, in the opposite direction when the current flow in the clockwise winding 116 predominates under control of the throttling means which in turn are controlled by the phase detector 76 and signal phase as detailed below. In either case the rate of forward or reverse motor rotation depends upon the relative values of the winding currents, which are related to the amplitude of the load cell signal and to rate of load increase or decrease. Until a given load increase or decrease has been properly recorded, the current in the related shade winding 114 or 116 continues to predominate with appropriate carriage motor rotation and servo-balance of the load cell 34, as noted upon in the description of FIGURE 6.

As described more fully below, the amplifier portion of the driver-amplifier 80 is biased, and the aforementioned throttling circuits for the shading windings 114 and 116 are provided with a D.C. bias through conductor 118 from the secondary transformer winding 104. Either or both of the signal conductors 78a and 78b to the driver-amplifier 80 are related in feed back relation to anti-hunt potentiometer 120 which in this example is actuated simultaneously with the servo-balance potentiometer through the common actuating pulley 64. The potentiometer 120 supplies a variable and opposing signal through rate feed-back capacitance 122 to the desired signal conductor 78a or 78b of the driver-amplifier.

Referring now to FIGURE 8 of the drawings, the preamplifier circuit 74 is illustrated in detail. In the latter circuit arrangement the load cell signal, which is in the millivolt range, is amplified in several conventional amplifying stages, each including a transistor 124. The transistors 124 are each arranged in conventional circuit configurations with a stabilizing feed-back arrangement. The output of the final amplifying stage is fed through coupling capacitance 130 and conductor 108 to phase detector 76, shown in detail in FIGURE 9 of the drawings.

Figure 9:
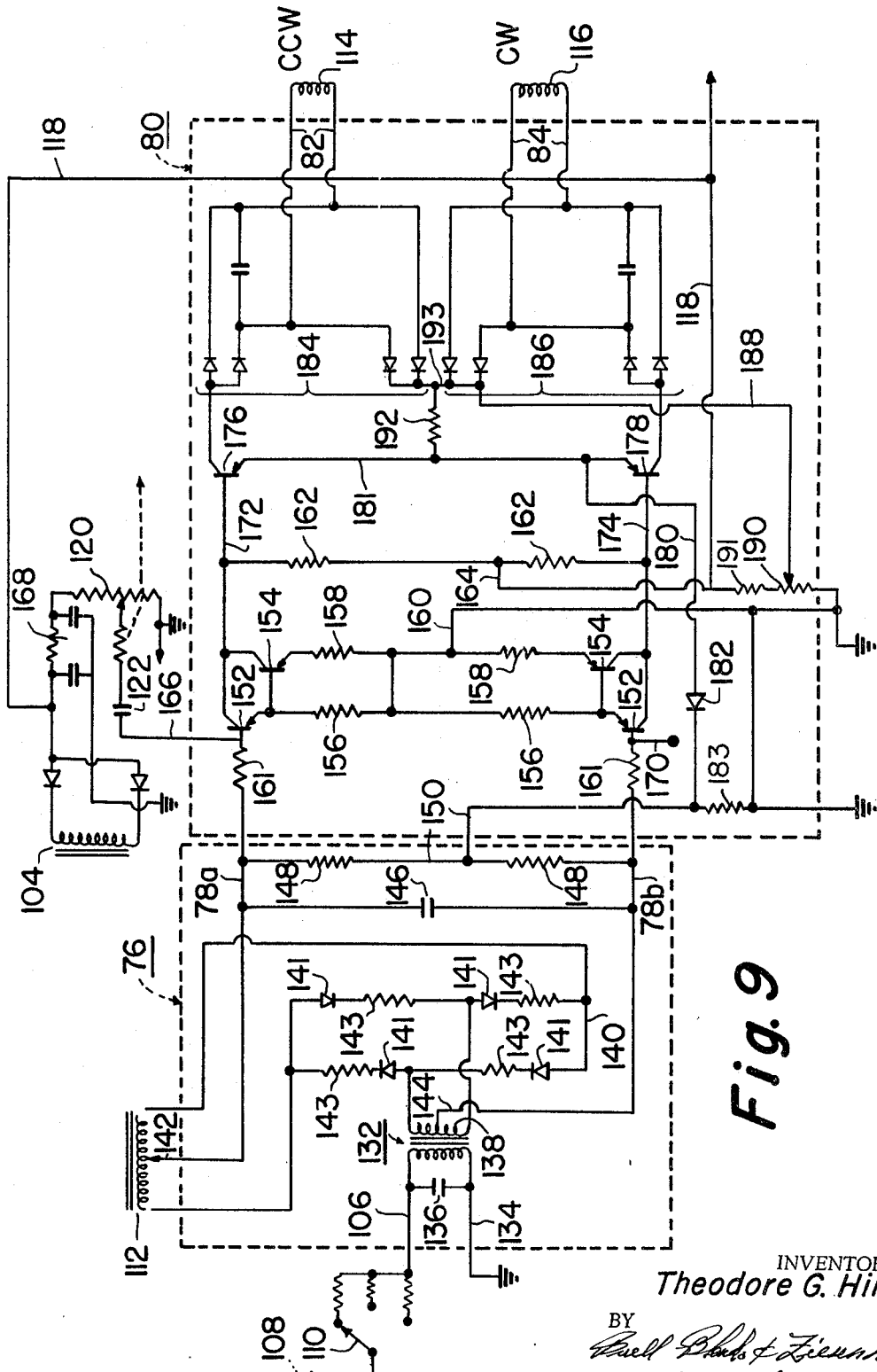
FIGURE 9 is a detailed schematic circuit diagram of the phase detector and driver amplifier shown generally in FIGURE 7.

In the phase detector portion 76 of the schematic circuit arrangement of FIGURE 9, the incoming amplified load cell signal on conductor 108 is applied to the primary winding of signal transformer 132 which is referenced to ground through conductor 134. A capacitance 136 is connected across conductors 106 and 134 to reduce the inductive load. Secondary winding 138 of the signal transformer 132 is connected with the aforementioned phase reference secondary winding 112, through a conventional phase detecting network denoted generally by reference character 140 and including switching diodes 141 and trimmer resistances 143. When thus coupled the increasing load signal conductor 78a has its genesis at center tap 142 of the phase reference winding 112 while the decreasing load signal conductor 78b originates at the secondary center tap 144 of the signal transformer 132.

During an increasing load interval, the load cell signal is greater than the balancing voltage on conductor 70 and therefore is out of phase therewith as set forth above. The phase detecting network 140 and secondary winding 112 produce at center tap 142 a ripple D.C. voltage which is positive with respect to the ripple D.C. voltage on center tap 144 of the signal transformer 132. Thus the voltage on signal conductor 78a is positive with respect to that on signal conductor 78b. During decreasing load interval the reverse occurs, when the balancing voltage on conductor 70 predominates, and the voltage on signal conductor 78b is more positive than that on conductor 78a.

With an increasing rate of load increase or decrease the voltage on the associated signal conductors 78a or 78b becomes increasingly more positive than that on the other of the conductor 78a and 78b. As described more fully hereinafter, such variation in signal voltages utilized to drive the stylus carriage motor, in this example, at varying speeds in either the CCW or CW directions depending upon the rate and direction of load changes.

A capacitance 146 is connected across the signal conductors 78a and 78b in order to provide a partial filtering action. If the capacitance 146 is too large the load signals become so smooth as to inadequately reflect variations in load. On the other hand, if the capacitance 146 is too small undesirable voltage spikes, etc., are permitted to flow to the driver amplifier circuit 80. Resistances 148 and branched conductor 150 provide a ground reference for both of the signal conductors 78a and 78b.

The amplitude of the signal on conductor 78a or 78b is of the order of plus or minus one volt and is modified in this example by a feedback circuit including the aforementioned ground reference path and the Zener diode 182 and associated components described below. Suffice it to say here, however, that the feedback current is a function of the sum of the shade winding currents and also compensates for temperature drift in various circuit components.

Referring now to that portion of FIGURE 9 designated as the driver-amplifier 80, it will be seen that a pair of amplifying and throttling circuits are incorporated therein for the shading windings 114 and 116 respectively. In this example the amplification circuit for each signal path 78a or 78b includes a pair of emitter-follower and signal-amplifier transistors 152 and 154 which are referenced to ground respectively through emitter resistances 156 and 158 and branched grounding conductor 160. The signal voltages on conductors 78a and 78b are applied to the bases of the emitter-follower transistors 152 through resistances 161. The collector circuits of the transistors 152 and 154 are energized through collector load resistances 162, branch conductor 164 and conductor 118, by the center-tapped winding 104 and full-wave rectifying circuit associated therewith. The connection of each pair of the transistors 152, 154 increases the input resistance of the circuit.

In the arrangement, the aforementioned anti-hunt potentiometer output is connected to the increasing load signal conductor 78a through conductor 166. The anti-hunt potentiometer 120 also is energized by the winding 104 through a conventional filter network denoted generally by reference character 168. If desired, the decreasing load signal path 78b likewise can be connected to anti-hunt potentiometer circuit, as denoted by terminal lead 170.

The outputs of the transistors 154 are fed through conductors 172 and 174 to a pair of throttling circuits respectively represented here by a pair of throttling transistors 176 and 178. The signal voltages applied to the bases of the transistors 176 and 178 are developed across the aforesaid collector load resistances 162 of amplifying transistors 154. Except for increased amplitudes, the character of the voltages on conductors 172, 174 bear the same relationship to one another as those on signal conductors 78a, 78b. The collectors of the throttling transistors 176 and 178 are connected respectively to full-wave rectifier bridges 184 and 186 which are in turn connected respectively to shading windings 114 and 116 through their leads 82 and 84. The circuits through the rectifier bridges 184, 186 and windings 114, 116 are completed through common feed-back resistance 192 to the emitters of the throttling transistors 176, 178. The rectifying networks 184 and 186 rectify the A.C. voltages generated locally in the shade windings 114, 116, as aforesaid by the field winding 117 (FIGURE 7) by a signal appearing on phase detector output conductor 78a or 78b.

The amount of resultant direct current flowing through each winding 114 or 116, however, is dependent upon the degree to which the associated throttling transistor 176 or 178 is rendered conductive by the amplified signal voltage applied to its base through conductor 172 or 174. Of course, the winding 114 or 116 having the larger current will determine the direction of carriage motor rotation. On the other hand, when the currents in windings 114 and 116 are equal, as when the stand 16 (FIGURE 1) is motionless or the load on the specimen is otherwise unchanging, the load cell 34 is balanced, the voltages on conductors 78a, 78b and 172, 174 are equal, and the resultant currents in the shade windings 114, 116 are, therefore, equal. At this time, of course, there is no carriage motor rotation.

As load upon a specimen supported by the stand 16 begins to increase, a similar increase in the resultant current of winding 114 initiates CCW rotation of the stylus carriage motor, which continues as long as load increases. At the same time the balancing potentiometer 66 (FIGURE 7) is moved in the balancing direction by the cable 54 and pulley 64 (FIGURE 5) to increase voltage on conductor 70. The chart 52 and the related mechanical and circuit components are so calibrated that when load levels off the load cell 34 is balanced and motor rotation ceases as the stylus 30 records the corresponding load value. As specimen load decreases the reverse occurs and the current of shade winding 116 increases to rotate the carriage motor 62 in the clockwise direction to record decreasing load.

In either case, the degree to which the throttling transistors 176, 178 are rendered conductive is directly dependent upon the rate of load changes. As the loading rate increases the base of transistor 176 is rendered more positive with respect to the base of transistor 178 and the carriage motor 62 rotates faster in the CCW or increasing load recording direction, as a result of the increased flow of current through the shade winding 114 and the throttling transistor 176. By the same token, an increase in unloading rate increases the current of shade winding 116 to rotate motor 62 faster in the opposite or decreasing load recording direction. With this arrangement the stylus carriage motor 62 seldom operates at full speed during normal testing procedures. Full speed operation occurs, however, upon specimen failure or when direction of movement of the stand 16 is intentionally reversed, at which time the amplified signal voltage on one of the conductors 172, 174 becomes sufficiently negative to bias the associated throttling transistor 176 or 178 to cut-off and no current flows in the related shade winding to counterbalance current in the other shade winding.

In order to stabilize the recording circuit and mechanism, it is desirable to maintain constant the summation of currents in the carriage motor shade windings 114, 116. When so maintained, load fluctuation which produce a corresponding current increase in one of the shade windings, in this example cause the current in the other shade winding to be reduced by a similar amount. Thus the percentage change in current differential between the shade windings will be equal to approximately twice the percentage change of a given increase in signal voltage on load cell output conductor 72. One arrangement for stabilizing the summation of shade winding currents includes the aforementioned feed-back resistance 192 across which is developed a relatively low D.C. voltage by the shade winding currents. This voltage is adjustably matched with the signal levels on conductors 78a and 78b by means presently to be described, and fed back thereto through conductors 181 and 180 connected as aforesaid to the ground reference network 148–150 for the signal conductors. In this connection an error voltage is developed across resistance 183 connected between diode 182 and ground. This error voltage is applied through conductor 150 to both of the transistors 152 and counteracts any tendency toward increased current in the shading windings 114, 116. Diode 182 and resistance 183 thus provide a difference voltage from the comparison of the voltage across common resistance 192 and the voltage divider represented by potentiometer 190 and resistance 191.

' One arrangement for so matching the last-mentioned voltage, includes the application of an adjustable D.C. bias to the junction of feedback resistance 192 and rectifier bridge common conductor 193 through conductor 188 and potentiometer 190, coupled to power supply conductor 118. The voltage subtracting means or Zener diode 182 is selected such that the combined bias and resistance voltages are reduced therein to the order of the signal voltages. With this arrangement any tendency of the shade winding current summation to decrease causes each of the voltages on conductors 172, 174 to become slightly more positive, thereby causing similar and simultaneous increases in conductivity of the throttling transistors 176, 178. The purpose of the stabilizing circuit is primarily to compensate for temperature drift in the various circuit components particularly the several transistors, and is sufficiently effective as to permit the use of inexpensive germanium transistors for example. The bias adjusting potentiometer 190 is set initially to compensate for manufacturing tolerances and usually needs no further adjustment.

In the operation of the invention, a deforming force is applied to a specimen (not shown) secured between the stand 16 (FIGURE 1) and the load cell arrangement 34, by upward movement of the stand 16 which causes the specimen to flow. In this example the stand 16 is moved at a constant rate to apply a constant rate of flow to the specimen, which rate is automatically recorded by the recording stylus assembly 30 moving along carriage bar 48 in the abscissa chart direction as controlled by cable 28, the flow drive pulley 26 and the specimen holder drive means 22 (FIGURE 2).

At the same time the varying loads applied to the specimen, and represented by varying forces applied thereby to the load cell 34 are also automatically recorded by ordinate movements of the stylus carriage 50 (FIGURES 1-3 and 5). As described previously, an increasing load signal is approximately 180° out of phase with a decreasing load signal. After suitable amplification in the preamplifier 74 (FIGURE 8) the load signal is applied as separate, varying voltages on the paired signal conductors 78a and 78b of the phase detecting circuit 76. The signal conductors, in this example, may be termed the load-increasing signal conductor 78a and the load-decreasing signal conductor 78b. Depending upon the phase relationship of the preamplifier output signal on conductor 108, as detected by the phase sensitive detector 76 (FIGURE 9), one of the signal conductors 78a, 78b is made more positive with respect to the other.

Assuming increasing load, the signal voltage on the conductor 78a becomes positive with respect to that on 78b, but both signal voltages are further amplified by the associated amplifying circuits 152–154 which then render the throttling circuits including transistors 176 and 178 to energize the varying conductive shaded carriage motor windings 114, 116. During increasing loads, the more positive, amplified signal voltage on conductor 172 renders throttling transistor 176 more conductive than transistor 178 so that the greater current in shade winding 114 rotates the carriage motor 62 and drive pulley 60 (FIGURE 5) in the counterclockwise direction to move the stylus carriage in the increasing ordinate direction of the chart 52 as viewed in FIGURE 1 of the drawings. Such rotation and load recording continues until the servo-balance potentiometer pulley 64, which is rotated by its engagement with the load drive cable 54, increases the voltage on conductor 70 to balance the load cell 34. The load cell 34 is suitably calibrated by variable resistance means 194 (FIGURE 7) so that the load is properly recorded at this point on the chart 52 in suitable units.

At the same time the anti-hunt potentiometer 120 is actuated also by the common potentiometer pulley 64 to impose a rate-sensitive countering voltage from differential capacitance 122 to damp out any tendency of the recording circuit to oscillate.

Similarly, during decreasing loads the signal voltage appearing on the phase detector output conductor 78b becomes more positive with respect to that on conductor 78a to increase the current in the clockwise motor winding 116 relative to CCW winding 114 to drive the stylus carriage 50 in the decreasing ordinate direction of the chart 52. In this case also the stylus carriage motor 62 continues to be energized until the load cell balancing voltage is again adjusted by the servo-balance potentiometer to balance the load cell 34. In this case the damping action of the anti-hunt potentiometer 120 is applied to the stylus carriage motor 62 by increasing the current in the opposite or counterclockwise winding 114 rather than opposing the signal as applied at this time to the clockwise winding 116. As mentioned previously, however, the anti-hunt signal can be applied directly to the signal conductor 78b through terminal conductor 170.

I claim:

1. In an indicating circuit the combination comprising a normally balanced transducer, a source of variable balancing potential coupled to said transducer, said transducer being capable of yielding an output signal when subjected to a stressing force, an indicating mechanism, driving means for said mechanism, circuit means coupled to said transducer output for energizing said driving means, and balancing potential varying means coupled to said driving means for terminating said transducer output signal and for de-energizing said driving means, when said indicating mechanism has indicated the amount of said force.

2. The combination according to claim 1 wherein said indicating circuit and said indicating mechanism are a recording circuit and a recording mechanism respectively, said transducer is a load cell bridge network coupled to said source of balancing potential and to a source of excitation potential, and said balancing potential is opposite in phase relative to the normal output signal of said transducer, so that said signal undergoes phase change from increasing to decreasing stressing forces.

3. The combination according to claim 2 wherein said driving means are reversible and said circuit means energize said driving means more strongly in one direction when said stressing force is increasing and more strongly in the opposite direction when said stressing force is decreasing, said circuit means including a phase detecting circuit coupled to said load cell and to said driving means.

4. The combination according to claim 1 wherein an anti-hunt circuit is coupled electrically to said circuit means and mechanically to said potential varying means to minimize or to eliminate oscillation of said indicating mechanism and said drivng means.

5. The combination according to claim 2 wherein said driving means is a shaded pole motor having a counterclockwise shading winding and a clockwise shading winding coupled to said phase detector circuit for energization thereby, one of said windings being energized more strongly when said force is increasing and the other of said windings being energized more strongly when said force is decreasing.

6. The combination according to claim 5 wherein a preamplifier for said output signal is coupled between said load cell and said phase detecting circuit.

7. The combination according to claim 5 wherein a signal amplifying and throttling circuit is provided for each of said windings, each of said circuits being coupled between said phase detecting circuit and said windings respectively.

8. The combination according to claim 7 wherein said amplifying and switching circuit means is a dual path amplifying and switching circuit having common ground and bias references and having its signal paths coupled respectively to said windings.

9. The combination according to claim 8 wherein variable anti-hunt circuit means are connected electrically to at least one of said circuit paths, said anti-hunt circuit means being mechanically coupled to said supply potential varying means.

10. The combination according to claim 8, wherein a common feedback circuit is coupled to both of said windings and to both of said amplifying circuits.

11. The combination according to claim 10 wherein said feedback circuit includes a feedback resistance connected to said windings, adjustable bias circuit is coupled to said feedback circuit between said windings and said resistance and voltage-subtracting circuit means are coupled between said resistance and amplifying circuits.

12. The combination according to claim 7 wherein each of said amplifying and throttling circuits includes a pair of transistor amplifiers coupled to said phase detecting circuit and a throttling transistor series-coupled to the associated one of said windings.

13. The combination according to claim 12 wherein said throttling transistors are connected to said windings through a pair of rectifying networks respectively, and said windings are transformer-coupled to a main field winding energized from a source of fluctuating potential.

14. The combination according to claim 2 wherein said driving means are reversible, and circuit means are coupled between said driving means and said output signal for reversing said driving means in accord with said phase change and for changing the speed of said driving means in accord with an amplitude of said output signal in either forward or reverse directions of said driving means.

15. The combination according to claim 7 wherein circuit means are provided for developing an error signal proportional to any change in total current of said winding, and a feedback circuit is coupled to said error signal means and to said amplifying and throttling circuit to counteract said change in total current.

16. In recording test equipment, the combination comprising a support structure, a specimen holder movably mounted on said support structure, a transducer mounted on said support structure and normally spaced from said specimen holder, said transducer being capable of yielding an output signal when subjected to a stressing force, a recording mechanism movably mounted on said support structure, said recording mechanism being movable at least in ordinate and abscissa directions, driving means for moving said specimen holder toward and away from said transducer, said driving means being coupled to said recording mechanism to move said mechanism a corresponding distance in one of said directions, additional driving means for moving said recording mechanism in the other of said directions, a recording circuit coupled to the signal output of said transducer and to said additional driving means for energizing the latter, said recording circuit including a variable source of balancing potential coupled to said transducer, and balancing potential varying means coupled to said additional driving means for terminating said transducer output signal and to de-energize said additional driving means when said indicating mechanism has indicated the amount of said force.

17. The combination according to claim 8 wherein said dual path amplifying and switching circuit contains two pairs of transistor amplifiers and a pair of throttling transistors.

References Cited

UNITED STATES PATENTS

| 2,537,498 | 1/1951 | Wickesser | 73—313 |
| 3,019,072 | 1/1962 | Bose et al. | 346—29 |
| 3,046,461 | 7/1962 | Luppold | 318—29 X |
| 3,136,158 | 6/1964 | Wharff et al. | 73—89 |
| 3,153,754 | 10/1964 | McDonald | 318—29 X |

RICHARD B. WILKINSON, *Primary Examiner.*

JOSEPH W. HARTARY, *Assistant Examiner.*